June 1, 1948. B. H. KOOKEN 2,442,498
TIMING MECHANISM FOR SPRINKLER SYSTEMS
Filed Dec. 29, 1945

Benjamin H. Kooken
INVENTOR

BY Glenn L. Fish
ATTORNEY

Patented June 1, 1948

2,442,498

UNITED STATES PATENT OFFICE 2,442,498

TIMING MECHANISM FOR SPRINKLER SYSTEMS

Benjamin H. Kooken, Spokane, Wash.

Application December 29, 1945, Serial No. 638,174

3 Claims. (Cl. 137—146)

1

This invention relates to a timing mechanism for sprinkler systems and it is one object of the invention to provide an apparatus by means of which a sprinkler system may be so controlled that various portions of large lawns may be successively sprinkled and each section of the lawn sprinkled for the same length of time.

Another object of the invention is to provide an apparatus wherein water is delivered from a main pipe or supply line to a drum about which a casing carrying branch pipes is mounted, the drum being rotatably mounted so that by rotating the drum its outlet may be successively brought into registry with the branch pipes and water cut off from the other branch pipes.

Another object of the invention is to provide an apparatus wherein the drum is intermittently rotated by means set in motion when buckets at ends of a rocker beam are filled with water delivered to them through tubes leading from the main pipe and provided with valves so that the length of time required to fill a bucket may be controlled.

Another object of the invention is to provide the apparatus with buckets provided at their bottoms with outlets controlled by valves which are normally closed and adapted to be moved inwardly to an opened position by engagement with rods mounted vertically under the buckets. It will thus be seen that the buckets may be filled with sufficient water to provide necessary weight to tilt the rocker bar and turn the drum to an adjusted position and the valve of a descending bucket opened to allow escape of the water after the drum has been moved to the adjusted position.

Another object of the invention is to provide a timing apparatus which is simple in construction and formed of parts which are obtainable at low cost and may be easily assembled.

The invention is illustrated in the accompanying drawings wherein.

Figure 1:
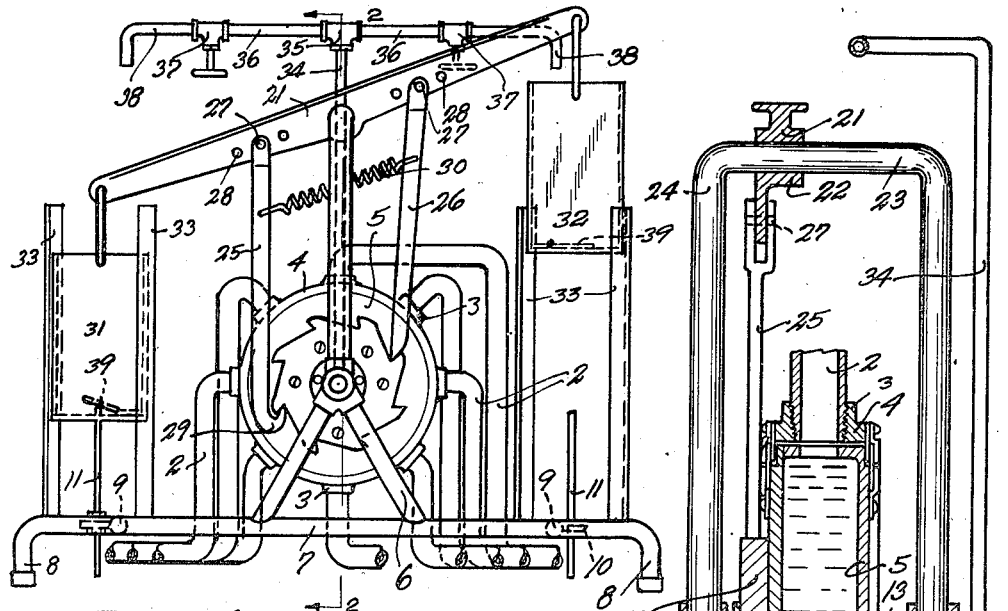
Fig. 1 is a side view of the improved timing and distributing apparatus.
Figure 3:
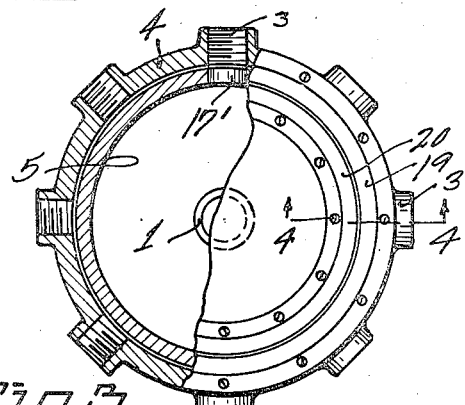
Fig. 3 is a view upon an enlarged scale showing the drum and the casing partially in section and partially in elevation.

This apparatus is for controlling flow of water from a main pipe 1 to branch pipes 2 which may be of any length desired and extend to various portions of a large lawn or to various portions

2 of a garden which it is desired to water. It will thus be seen that the device may be used in connection with a lawn sprinkling system or with an irrigating system for gardens, truck farms, and the like.

The branch pipes have their inner ends screwed into necks 3 which project radially from a circulating casing 4. This casing fits about a circular drum 5 which is disposed in vertical plane between standards 6 which project upwardly from opposite sides of a frame 7. The frame and the standards are formed of pipes or tubing and the side bars of the frame have downwardly bent end portions forming feet or short legs 8. End bars 9 extend between end portions of the side bars and from each end bar projects an ear 10 formed with an opening to receive a rod 11. The rods 11 extend vertically and have their lower portions threaded so that they may carry nuts 12 by means of which the rods are secured in vertically adjusted positions. At one side the drum is formed with a packed bearing 13 to receive the inner end portion of the supply pipe 1 and at its other side the drum carries a block 14 which is formed with teeth about its marginal edge face and serves as a ratchet wheel for the drum. A stub shaft 15 projects from the center of the ratchet wheel and is rotatably mounted through the bearing 16 at the upper end of one standard 6 and the supply pipe 1 passes through the corresponding bearing at the upper end of the other standard.

Figure 4:
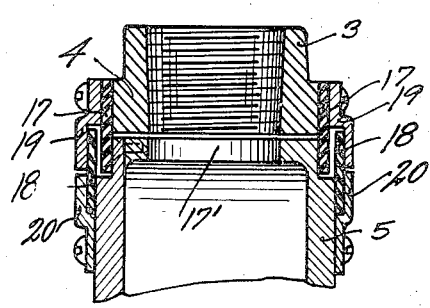
Fig. 4 is a sectional view taken through the upper portion of the drum and the casing along the line 4—4 of Figure 3.

By rotating the drum the outlet opening formed through its peripheral wall will be successively moved into registry with the outlet necks 3 of the casing 4 and water will flow from the drum through this neck and the branch pipe leading from it. The drum fits snugly in the circular casing and in order to prevent leakage of water between the drum and the casing there have been provided sealing rings 17 and 18 which are secured against side faces of the casing and the drum by rings 19 and 20. These rings are clearly shown in Figure 4 and referring to this figure it will be seen that the rings 18 overlap the rings 17 and engaged by both of the rings 19 and 20. Therefore when the rings 17 are forced outwardly by pressure of water and brought into engagement with the rings 18 sealed joints will be formed and leakage can not occur.

In order to intermittently rotate the drum and move its outlet opening successively into registry with the necks 3 of the frame there has been provided a rocker bar 21 which is formed midway its length with a bearing 22 to receive the bridge 23 of a yoke 24. The yoke extends vertically and is of inverted U-shape, the lower end of its arms being mounted in upper portions of the bearings or heads 16 of the standards 6. Arms 25 and 26 which extend downwardly from the bar have their upper ends pivotally connected with it by pins 27 which pass through selected ones of the openings 28 formed through the bar 21. The lower end of the arm 25 is formed with a hook 29 to engage under teeth of the ratchet wheel or block 14 and the lower end of the arm 26 rests upon a tooth of the ratchet wheel at the opposite side thereof from the arm 25. Therefore when the rocker bar is tilted in one direction and the arm 25 is moved upwardly while the arm 26 moves downwardly the drum will be rotated a sufficient distance to move the outlet opening of the drum from a position in registration with one neck 3 to a position for registration with the next neck. A spring 30 yieldably holds the two arms in position for contact with the ratchet wheel and allows their lower ends to pass the teeth of the ratchet wheel when the rocker bar is tilted to its original position after turning the drum.

Figure 2:
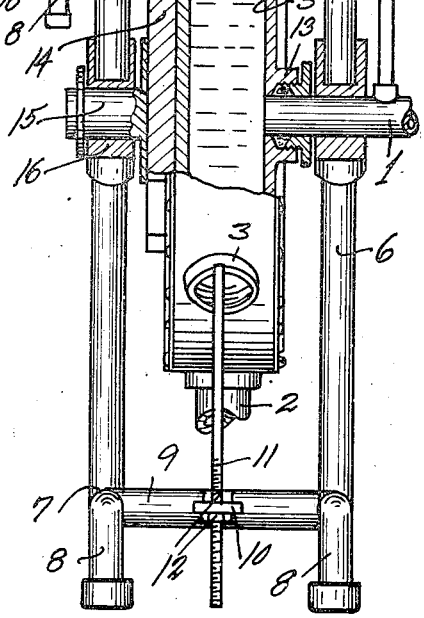
Fig. 2 is a view taken along the line 2—2 of Figure 1.

Buckets 31 and 32 are suspended from opposite ends of the rocker bar and vertical movements of the buckets during tilting of the bar is guided by strips 33 which extend upwardly from end portions of the frame 7 and serve as tracks for the bucket. A branch pipe or tube 34 extends upwardly from the supply pipe 1 and has its upper portion brought forwardly, as shown in Figure 2, and then bent upwardly, as shown in Figure 1, the upper end of this pipe or tube being in threaded engagement with a T-coupling 35 from which extends tubes 36. The tubes 36 carry valves 37 from which extend short tubes having downwardly bent ends and constituting spouts from which water will flow when the valves 37 are opened and since the nozzles 38 are located over the buckets water flowing from them will fill the buckets. By adjusting the valves 37 the speed at which water flows may be regulated and the time required to fill the buckets controlled. When the bucket 32 is filled the weight of the water will be sufficient to swing the raised end of the rocker bar downwardly and as the bar is rocked about the bridge of the yoke 24 the arms 25 and 26 will act upon the teeth of the ratchet wheel 14 and turn the drum a sufficient distance to move its outlet 17' from registration with one of the necks 3 into registration with the succeeding neck. As the bucket 32 moves downwardly it approaches the rod 11 over which it is located and since each bucket has its bottom formed with a drain opening normally closed by a flap valve 39, mounted for upward movement to an opened position, the valve of the descending bucket will be moved to an opened position by engagement with the rod. The water will flow out of the bucket but its rate of flow will be such that the bucket 31 will move to a raised position before rocking movement of the bar stops. The valve of bucket 31 will now be closed and this bucket will be filled until the weight of the water carries it downwardly. During downward movement of the bucket 31 the arms 25 and 26 will slide over the teeth of the ratchet wheel. It will thus be seen that the ratchet wheel and the drum will only be turned during downward movement of the bucket 32 and that since the bucket is filled slowly and the bucket 31 is also filled slowly to return the bucket 32 to its raised position after being emptied a sufficient length of time will elapse between turning movements of the drum to permit a section of a lawn or garden to be well watered before the drum is moved to cut off flow of water through a branch pipe 2 and establish flow of water through another branch pipe. The speed at which the buckets are filled is controlled by adjusting the valves 37 and by vertically adjusting the rods 11 the distance the buckets will move downwardly before their valves 39 are opened may also be controlled.

Having thus described the invention, what is claimed is:

1. In a water distributing system, a base, brackets rising from said base, a drum between said brackets having a shaft extending from one side and rotatably supported by one bracket, a supply pipe supported by the other bracket, said drum being rotatably mounted about said pipe, a casing about said drum having circumferentially spaced outlets, distributing pipes leading from the outlets of said casings, said drum being provided with an outlet moved into position for successively registering with the outlets of the casing by rotation of the drum, a ratchet wheel mounted against a side of said drum concentric therewith and having teeth about its periphery, a yoke supported by said brackets and straddling the drum and its casing, a beam pivotally carried by said yoke, containers suspended from ends of said beam and each having an outlet opening through its bottom and an inwardly opening valve normally closing its outlet opening, arms pivoted at their upper ends to said beam and extending downwardly therefrom at opposite sides of said yoke, one arm having its lower end in position for resting upon the teeth of said ratchet and the other arm having a hook at its lower end for engaging under the teeth of the ratchet, a spring urging said arms into position for engaging the ratchet, a tube extending upwardly from said supply pipe and having valve-controlled branch tubes extending laterally from its upper end and terminating in depending spouts in position for flow of water therefrom into said containers to alternately fill the containers and thereby provide weight to rock the beam for intermittently rotating the drum and moving its outlet into registry with outlets of the casing, and rods extending upwardly from said base for engaging the valves and opening the valves to empty the containers after downward movement of the containers.

2. In a water distributing system, a frame, a drum in said frame rotatable about a pipe constituting a supply pipe for the drum, said drum having a peripheral wall formed with an outlet, a casing about said drum having circumferentially spaced outlets, a yoke carried by said frame and straddling the drum and its casing, a rocker beam pivoted upon said yoke, containers suspended from end portions of said rocker beam, tracks carried by said frame for guiding vertical movement of said containers, said containers having outlets in their bottoms normally closed by inwardly opening valves, rods carried by said frame for engaging the valves and opening the same as the containers move downwardly, a tube leading from said supply pipe and having branches for discharging water into the containers and gradually filling the containers when the containers are in a raised position and their valves closed, arms suspended from said rocker bar, and a ratchet wheel carried by said drum and engaged by said arms for rotating the drum and moving the outlet thereof into registry with outlets of the casing when the rocker bar is tilted by weight of a filled container.

3. In a water distributing system, a frame, a drum in said frame rotatable about a pipe constituting a supply pipe for the drum, said drum having a peripheral wall formed with an outlet, a casing about said drum having circumferentially spaced outlets, a yoke carried by said frame and straddling the drum and its casing, a rocker beam pivoted upon said yoke, containers suspended from end portions of said rocker beam, tracks carried by said frame for guiding vertical movement of said containers, said containers having outlets in their bottoms normally closed by inwardly opening valves, rods carried by said frame for engaging the valves and opening the same as the containers move downwardly, a tube leading from said supply pipe and having branches for discharging water into the containers and gradually filling the containers when the containers are in a raised position and their valves closed, a ratchet wheel carried by said drum, and members carried by said rocker bar for engaging said ratchet wheel and turning the drum when the rocker bar is tilted by weight of water in one container, said members having movement across teeth of the ratchet wheel without turning the drum when the rocker bar is tilted by weight of water in the other container.

BENJAMIN H. KOOKEN.

REFERENCES CITED

The following references are of record in the file of this patent:

UNITED STATES PATENTS

| Number | Name | Date |
|---|---|---|
| 264,717 | Liernur | Sept. 19, 1882 |
| 511,075 | Franke | Dec. 19, 1893 |
| 674,142 | DeVisser | May 14, 1901 |
| 825,370 | Zurbuch | July 10, 1906 |
| 1,561,004 | Lemon | Nov. 10, 1925 |
| 1,960,515 | Shield | May 29, 1934 |
| 1,992,877 | Monthan | Feb. 26, 1935 |